(12) United States Patent
Chen et al.

(10) Patent No.: US 7,339,945 B2
(45) Date of Patent: Mar. 4, 2008

(54) SYSTEM AND METHOD FOR PARTITIONING STREAMING DATA CODED WITH FINE GRANULARITY SCALABILITY OF USE IN A CABLE NETWORK

(75) Inventors: Fang-Chu Chen, Taipei (TW); Shang-Chih Ma, Taipei County (TW)

(73) Assignee: Industrial Technology Research Institute, Chutung, Hsinchu (TW)

( * ) Notice: Subject to any disclaimer, the term of this patent is extended or adjusted under 35 U.S.C. 154(b) by 1013 days.

(21) Appl. No.: 10/289,426

(22) Filed: Nov. 7, 2002

(65) Prior Publication Data
US 2003/0214968 A1   Nov. 20, 2003

Related U.S. Application Data

(60) Provisional application No. 60/380,861, filed on May 17, 2002.

(51) Int. Cl.
*H04L 12/28* (2006.01)
(52) U.S. Cl. .................. 370/421; 370/441; 370/442; 370/538; 725/117; 725/144
(58) Field of Classification Search ............. 370/420, 370/421, 441, 442, 476, 479, 537, 538; 725/116, 725/117, 144
See application file for complete search history.

(56) References Cited

U.S. PATENT DOCUMENTS 5,805,583 A * 9/1998 Rakib ..................... 370/342
6,018,528 A * 1/2000 Gitlin et al. ............. 370/436
6,791,995 B1 * 9/2004 Azenkot et al. .......... 370/436
6,937,770 B1 * 8/2005 Oguz et al. .............. 382/235
7,050,419 B2 * 5/2006 Azenkot et al. .......... 370/347
7,110,434 B2 * 9/2006 Currivan et al. ......... 375/144
7,203,206 B2 * 4/2007 Amidan et al. .......... 370/474

OTHER PUBLICATIONS

Radha, Chen, Parthasarathy, and Cohen, "Scalable Internet video using MPEG-4", Sep. 1999, Elsevier Netherlands, vol. 15, p. 95-126.*
Radha et al. "The MPEG-4 Fine-Grained Scalable Video Coding Method for Multimedia Streaming Over IP", Mar. 2001, IEE Transactions on Multimedia, vol. 3, p. 53-68.*

* cited by examiner

*Primary Examiner*—Hassan Kizou
*Assistant Examiner*—Brian T O'Connor
(74) *Attorney, Agent, or Firm*—Akin, Gump, Strauss, Hauer & Feld LLP

(57) ABSTRACT

System and method for partitioning data on a SCDMA cable network use methods of creating data streams to transmit to a head end. Further, the data streams transmitted to the head end are coded with fine granularity scalability features and contain divisions which are assigned codes based on predetermined criteria, so that in the event certain assigned codes are interrupted from service, all appliances along the network can be serviced without interruption.

10 Claims, 8 Drawing Sheets

SYSTEM AND METHOD FOR PARTITIONING STREAMING DATA CODED WITH FINE GRANULARITY SCALABILITY OF USE IN A CABLE NETWORK

PRIORITY CLAIM

The present application is related to and claims the priority of U.S. Provisional Application No. 60/380,861 filed May 17, 2002, in the names of FANG-CHU CHEN AND SHANG-CHIH MA, and titled FGS OVER SCDMA BY STREAM-CODE PARTITION, the entire contents of which are fully incorporated herein by reference.

DESCRIPTION OF THE INVENTION

1. Field of the Invention

The field of this invention relates generally to cable network and, more specifically, to partitioning multimedia-streaming data over a cable modem.

2. Background of the Invention

In computer networking today, subscribers on a network gain and share information, accessible by the network, through a service that provides access to the network. For each connected subscriber, several types of appliances may be used to access and share this network and information. Appliances may include personal computers, televisions, interactive gaming systems, and telephones. Cable networks connect to these appliances through a subscriber unit, such as a cable modem, to a head end, or through a service provider, which in turn connects the subscriber unit to the network and other subscribers located thereon. As the appliances communicate and transmit data, the subscriber unit relays the data to the head end, which transmits the data to the intended destination. The manner in which that data is sent and the characteristics of the data, such as the formatting, may have a significant impact on the speed of data transmissions on the network and the effectiveness of the head end to service all the appliances connected to the network.

Currently, Synchronous Code Division Multiple Access (S-CDMA) can be used for data transmission across cable networks. Using S-CDMA has advantages. For example, S-CDMA scatters or spreads digital data across a wide frequency band, so that multiple subscribers on the network may transmit and receive data at the same time, while allowing the data transmission to be secure and resistant to noise. Code Division Multiple Access (CDMA), on which S-CDMA is based, codes the signal so that a subscriber, associated with a particular code, may decode and reconstruct the signal. Issues may arise where it is required to prevent some appliances from transmitting along the network. In particular, these issues arise when the head end is processing applications involving multi-media streaming, as these types of applications can involve large amounts of bandwidth. Processing large applications can disrupt the effectiveness of the head end to service all the subscribers and appliances on the network.

One technique for increasing the efficiency of the network is for the head end to assign predetermined levels of importance, or codes, to the data according to the source or appliance generating that data. The desired effect is that when network traffic gets too congested, appliances with a lower importance level are not serviced until the traffic becomes less congested. This leads to many possible problems, such as delays in servicing some appliances, or in some cases, termination of service to some appliances.

S-CDMA transmitters, which convert data into a format suitable for transmission, are of the type suggested in the Data Over Cable Systems Interface Specifications (DOCSIS) 2.0, Radio Frequency Interface Specification, SP-RFIv2.0-101-011231. DOCSIS 2.0 is an industry standard relating to radio frequency interface specifications for cable networks. Specifically, input data, in S-CDMA format, on the transmitter is coded by channel and framed. Thereafter, the data is spread over one or more codes selected from a predetermined code set. After spreading, the data is converted to analog form, filtered, and modulated into a radio frequency (RF) signal which is transmitted to the head end through a coaxial cable.

In a cable network, the total uplink bandwidth on the cable is shared by all the subscriber units connected to the cable. Since the data traveling on the cable is changing over time, the head end has the authority to dynamically change the bandwidth allocated for each subscriber unit. In terms of an S-CDMA system, changing bandwidth means that the head end changes the number of codes assigned to each subscriber. When codes are assigned on a stream-by-stream basis and the head end instructs the subscriber unit to interrupt service for a particular code, problems may occur in continuing services of the streams associated with that code.

In non-cable network applications, techniques such as Fine Granular Scalabiltity (FGS), which provide flexibility in adjusting bit rates of the data, have been used to combat the problem of data traffic congestion on a network. In FGS, every encoded bit has two layers or sections: a base layer and an enhancement layer. As an inherent property of FGS encoding, the base layer must be received. On the other hand, the enhancement layer does not have to be received, or in the alternative, only partially received. The overall quality of the signal, however, depends upon the length of the enhancement layer received so that, as more of the enhancement layer is received, an increase is observed in the decoded stream's quality.

Currently, incorporating FGS on a cable network using S-CDMA has problems. In a typical S-CDMA system, levels of importance are assigned on a stream-by-stream basis, or in other words, based on the source of the data. FGS is not a suitable choice to remedy the problems discussed earlier, such as the interruption of service to some appliances. Specifically, in an S-CDMA system, each source stream is assigned a code, and this causes difficulty in managing bandwidth on the cable among multiple appliances. Because the head end is allowed to dynamically change the bandwidth for a subscriber unit, which means reallocating the assigned codes, the subscriber unit should be able to respond quickly in order for the cable network to effectively operate. If a stream is assigned a code, the subscriber unit response could be complex. For example, if the head end directs that a certain code will not be available, the stream, and the associated service, may have to stop. Therefore, in order for all streams to be serviced without termination of service to some sources, the source of data associated with the non-available code will have to share the code with other sources. This involves redesign of the framing process, a process used to format data, so that the data is suitable for transmission according to the protocols of the network. Consequently, communications between the higher layers of the subscriber unit and the head end will, undesirably, need to increase in order to ensure that the subscriber unit and the head end are configured properly with respect to each other. Moreover, since streams share codes and thus share bandwidth as well, a bit rate associated with a particular stream is not preserved after re-assignment of the codes.

SUMMARY OF THE INVENTION

In accordance with the invention, a method for partitioning information on a cable network, including one or more appliances and data associated with each transmitting appliance, wherein the associated data comprises a bit rate and a frame length, said method comprising creating a source stream, corresponding to each transmitting appliance and representing a continuous form of the associated data, containing at least one segment, wherein each segment is associated with one of the transmitting appliances and is assigned a code indicating a predetermined level of importance; creating a partition stream, corresponding to each segment, containing at least one block, wherein each block represents an amount of time in relation to the bit rate and frame length of the associated data; and creating a code stream, corresponding to each block with the same assigned code, and containing at least one coded frame, wherein each frame represents an amount of time to process one block from every source stream.

Also, in accordance with the invention, a system for partitioning information on a cable network, wherein the cable network includes one or more appliances and data associated with each transmitting appliance, wherein the data comprises a bit rate and a frame length, said system comprising: means for creating source streams, corresponding to each transmitting appliance and representing a continuous form of the associated data, containing at least one segment, wherein each segment is associated with one of the transmitting appliances and is assigned a code indicating a predetermined level of importance; means for creating partition streams, corresponding to each segment, containing at least one block, wherein each block represents an amount of time in relation to the bit rate and frame length of the associated data; and means for creating code streams, corresponding to each block with the same assigned code, and containing at least one coded frame, wherein each frame represents an amount of time to process one block from every source stream.

Additional features and advantages of the invention will be set forth in part in the description which follows, and in part will be obvious from the description, or may be learned by practice of the invention. The features and advantages of the invention will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments of the invention and together with the description, serve to explain the principles of the invention. In the drawings.

It is to be understood that both the foregoing general description and the following detailed description are exemplary and explanatory only and are not restrictive of the invention, as claimed.

DESCRIPTION OF THE EMBODIMENTS

Figure 1:
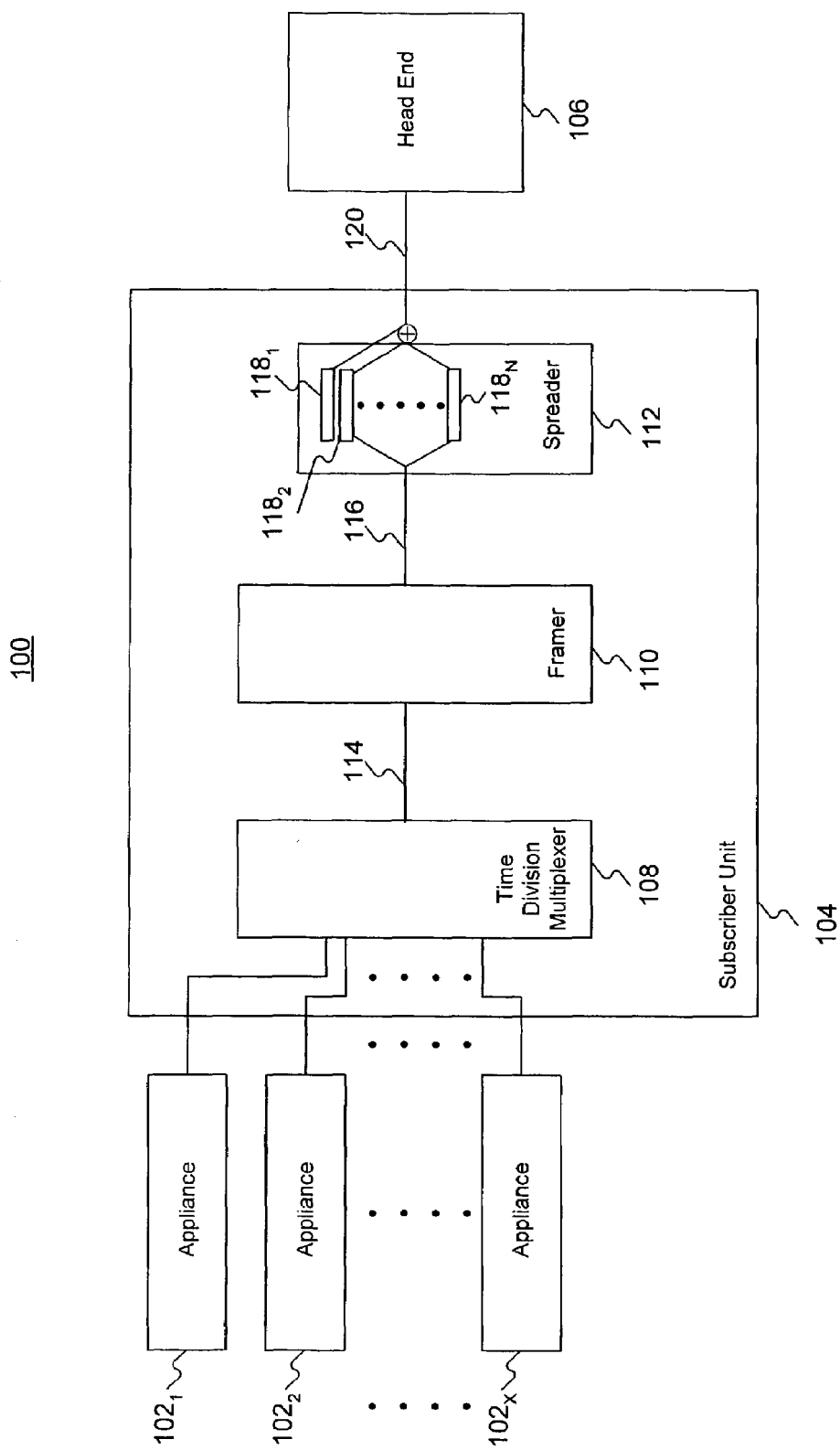
FIG. 1 is a simplified block diagram of a cable system.

Referring now to the drawings, in which the same reference numbers will be used throughout the drawings to refer to same or like parts, FIG. 1 is a block diagram of a cable system 100. System 100 includes a number X of appliances $102_1$-$102_X$ connected to a subscriber unit 104, which in turn is connected to a head end 106. Appliances $102_1$-$102_X$ may include devices such as interactive televisions, personal computers, video conference units, telephones, and interactive gaming systems. Subscriber unit 104 includes a time division processor 108, a framer 110, and a spreader 112. In addition, time division processor 108 creates a time division multiplexed (TDM) signal 114, framer 110 creates a code domain signal 116 from N codes $118_1$-$118_N$, and spreader 112 creates a spread signal 120.

In system 100, signals from appliances $102_1$-$102_X$ are sent to subscriber unit 104, where each signal is processed by time division processor 108 to create TDM signal 114. TDM signal 114 represents data sent from appliances $102_1$-$102_X$, wherein each of appliances $102_1$-$102_X$ has a dedicated time for service within TDM signal 114. TDM signal 114 may be subject to other conditioning by division processor 108, such as channel coding, scrambling, buffering, or amplification. Framer 110 receives TDM signal 114 and converts TDM signal 114 into code domain signal 116. Framer 110 is a device which conditions and controls an incoming signal so that the data fields (i.e., addresses, data, error checking information) associated with the incoming data stream can be configured to transmit along the network in compliance with protocols characteristic of the network. Specifically, framer 110 assigns codes $118_1$-$118_N$ to portions of TDM signal 114 according to predetermined criteria. Once codes $118_1$-$118_N$ are assigned to portions of TDM signal 114, code domain signal 116 is formed. The predetermined criteria may include establishing an importance level based on the position of the data within TDM signal 114 (e.g., based on the source of the data). For example, codes $118_1$-$118_N$ may be assigned according to which of appliances $102_1$-$102_X$ generated the signal being processed. Further, it may be desirable, in the event of heavy data traffic congestion, to terminate service from a personal computer, so that an interactive television may transmit. In this case, the personal computer would be assigned one of codes $118_1$-$118_N$ indicating a lower importance than one of codes $118_1$-$118_N$ assigned to the interactive television, and head end 106 may determine that the one of codes $118_1$-$118_N$ assigned to the personal computer should not be transmitted along the network.

After framing, code domain signal 116 is sent to spreader 112. In spreader 112, code domain signal 116 is separated and spread so that data is grouped according codes $118_1$-$118_N$. For example, all data associated with code $118_1$ is grouped together, all data associated with code $118_2$ is grouped together, continuing until all data associated with code $118_X$ is grouped together. These groupings are then spread to form spread signal 120. Spread spectrum signals are distributed over a wide range of frequencies and then collected onto their original frequency at the receiver, and allow the signals to be resistant to noise, interference, and snooping. In other words, data associated with one of appliances $102_1$-$102_X$ is now grouped according to assigned codes $118_1$-$118_N$ and transmitted as a spread spectrum signal to head end 106. Spread signal 120 may be in the form of an S-CDMA signal as described, and incorporated herein, by DOCSIS 2.0.

Multiplexer 108 and spreader 112 can be of the type found in the DOCSIS 2.0 standard previously discussed and incorporated herein by reference. Framer 110 can be implemented in accordance with the methods illustrated in FIGS. 2-8.

Figure 2:
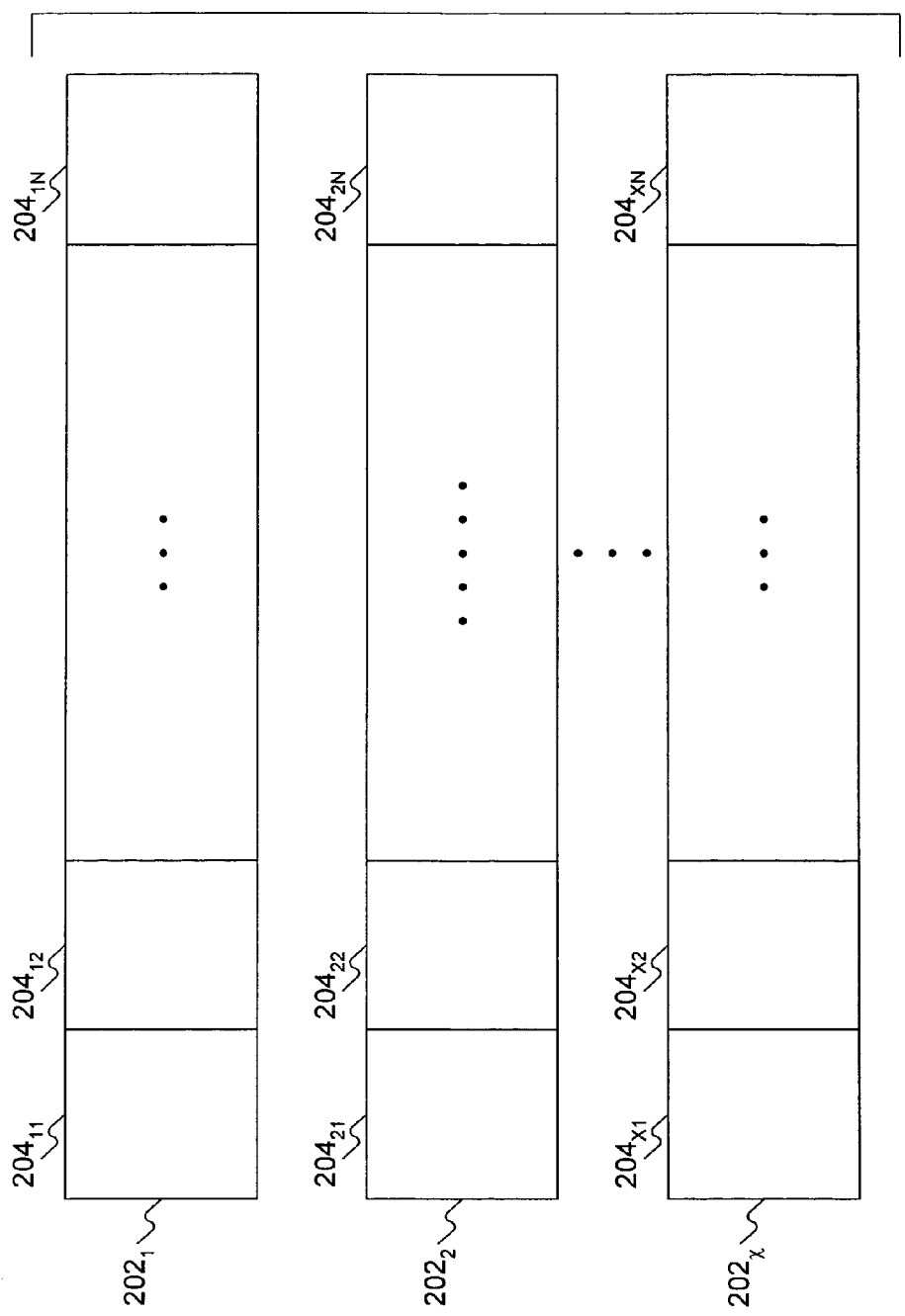
FIG. 2 is a schematic representation of source data streams, each of the length of one data frame, used on the cable system of FIG. 1.

FIG. 2 illustrates a number X of frames $202_1$-$202_X$, each representing a frame of source data streams generated by one of appliances $102_1$-$102_X$, collectively containing X*N segments $204_{11}$-$204_{XN}$ constructed and used in system 100 shown in FIG. 1, wherein X represents the number of appliances $102_1$-$102_X$ and N represents the number of codes $118_1$-$118_N$ assigned by head end 106.

Thus, frames $202_1$-$202_X$, in the form of a bit stream, are sent from appliances $102_1$-$102_X$ of FIG. 1, respectively, to subscriber unit 104. Typically, frames $202_1$-$202_X$ represent coded streaming data transmitted from appliances $102_1$-$102_X$ and is finite in nature (i.e., there exists a definite time for a beginning and end to each of frames $202_1$-$202_X$ generated by each of the appliances $102_1$-$102_X$). Frames $202_1$-$202_X$ contain segments $204_{11}$-$204_{XN}$, which are divisions within frames $202_1$-$202_X$ and, as shown in FIG. 2, are assigned values associated with codes $118_1$-$118_N$.

Figure 3:
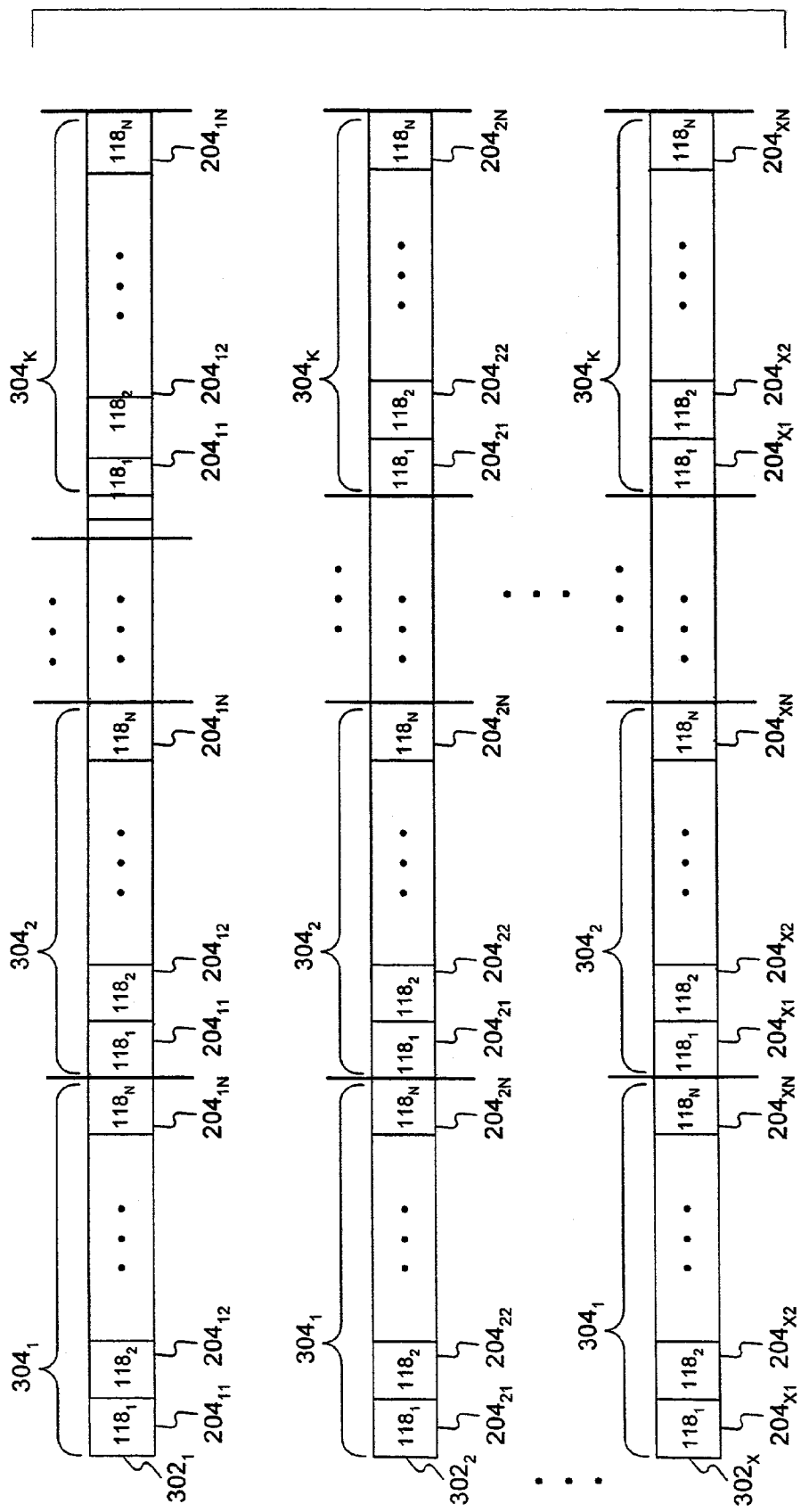
FIG. 3 is a schematic representation of source streams constructed from the frames of FIG. 2.

FIG. 3 illustrates a number X of source streams $302_1$-$302_X$ constructed from frames $202_1$-$202_X$ of FIG. 2 consecutively generated in time by the corresponding one of appliances $102_1$-$102_X$. Source streams $302_1$-$302_X$ contain segments $204_{11}$-$204_{XN}$ and a number K of frames $304_1$-$304_K$, wherein X is the number of appliances $102_1$-$102_X$, N is the number of codes $118_1$-$118_N$ assigned by head end 106, and K is a number of times that frames $202_1$-$202_X$ are consecutively generated.

Source streams $302_1$-$302_X$ are a continuous and consecutive representation of frames $202_1$-$202_X$, respectively. In other words, the structure of frames $202_1$-$202_X$ are repeated, although the information for each of consecutive frames $202_1$-$202_X$ is different, and connected for each of frames $304_1$-$304_K$ to form source streams $302_1$-$302_X$. For example, all of frames $304_1$-$304_K$ are connected to form source stream $302_1$, thereby representing a continuous form of frame $202_1$. All segments $204_{11}$-$204_{XN}$ from different frames $202_1$-$202_X$ are thus assembled. Segments $204_{11}$-$204_{XN}$ are assigned codes $118_1$-$118_N$. More particularly, subscriber unit 104 assigns codes $118_1$-$118_N$ to source streams $302_1$-$302_X$ according to different importance levels in each stream. According to the principles contained with DOCSIS 2.0, head end 106 assigns codes $118_1$-$118_N$ to subscriber unit 104. However, in FIG. 3 head end 106 labels codes $118_1$-$118_N$ with, for example, different importance levels and codes $118_1$-$118_N$ are assigned to segments $204_{11}$-$204_{XN}$ while source streams $302_1$-$302_X$ are being processed by framer 110. For example, segment $204_{11}$ associated with source stream $302_1$ is assigned code $118_1$, segment $204_{12}$ associated with source stream $302_1$ is assigned code $118_2$, continuing to segment $204_{1N}$, which is associated with source stream $302_1$ and is assigned code $118_N$. This process is repeated for the rest of source streams $302_2$-$302_X$. As previously described, codes $118_1$-$118_N$ may indicate a relative importance level of each of segments $204_{11}$-$204_{XN}$ contained within the same one of source streams $302_1$-$302_X$. The length of each of segments $204_{11}$-$204_{XN}$, associated with each of appliances $102_1$-$102_X$, may be different, depending upon the frame length of the corresponding one of source streams $302_1$-$302_X$. The purpose of having segments $204_{11}$-$204_{XN}$ in source streams $302_1$-$302_X$ is to prioritize data within source streams $302_1$-$302_X$ transmitted from appliances $102_1$-$102_X$ according to codes $118_1$-$118_N$.

Source streams $302_1$-$302_X$ may be formed using framer 110 of FIG. 1.

Figure 4:
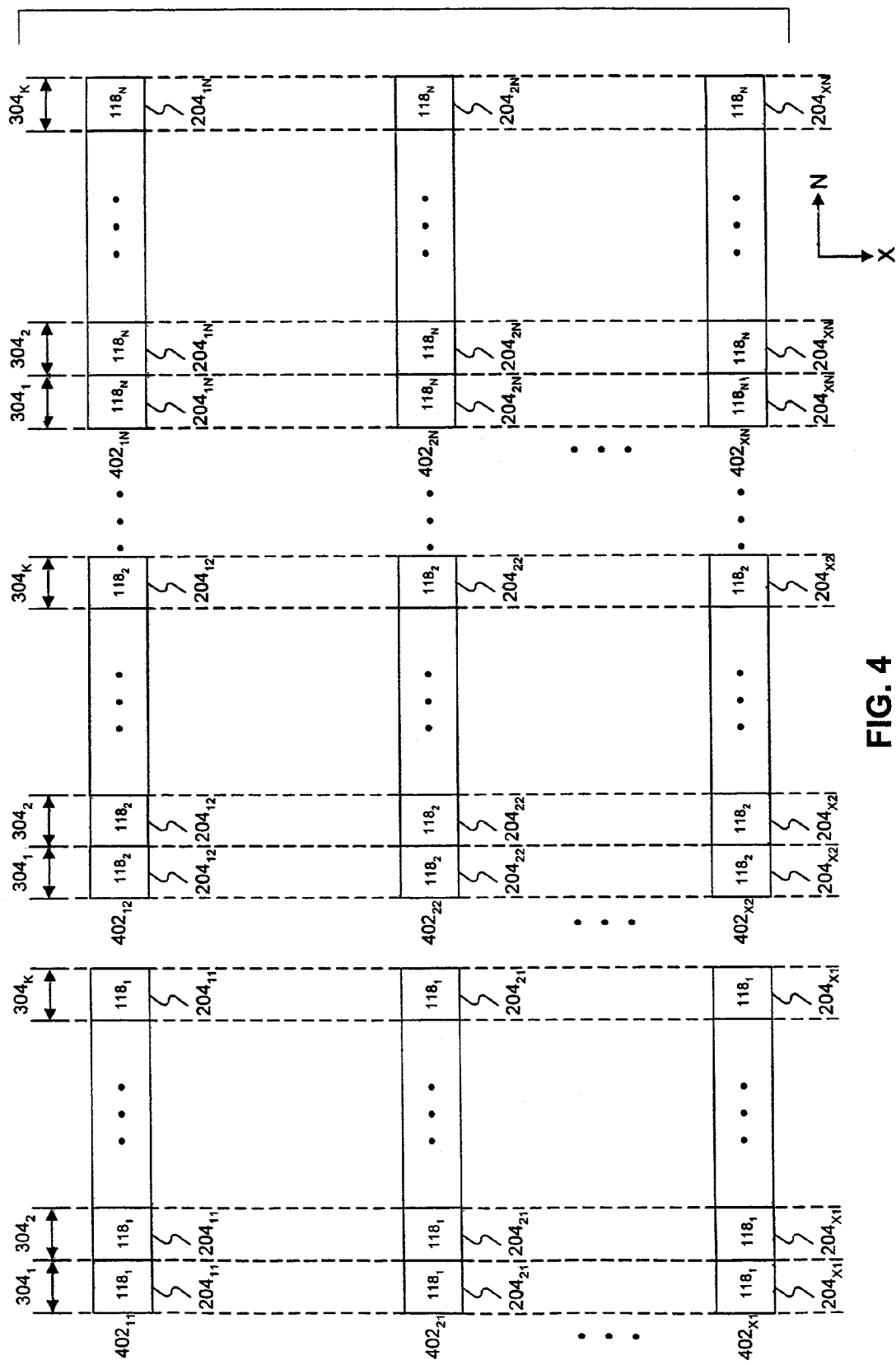
FIG. 4 is a schematic representation of partition streams constructed from the source streams of FIG. 3.

FIG. 4 illustrates a number X*N of partition streams $402_{11}$-$402_{XN}$, constructed from source streams $302_1$-$302_X$ of FIG. 3. Partition streams $402_{11}$-$402_{XN}$ also include segments $204_{11}$-$204_{XN}$, wherein segments $204_{11}$-$204_{XN}$ are associated with codes $118_1$-$118_N$. As previously described, X is the number of appliances $102_1$-$102_X$ and N is the number of codes $118_1$-$118_N$ assigned by head end 106.

Partition streams $402_{11}$-$402_{XN}$ are formed to create new data streams that group segments $204_{11}$-$204_{XN}$ associated with codes $118_1$-$118_N$ for each of frames $304_1$-$304_K$. For example, partition stream $402_{11}$ includes all segments $204_{11}$ from frames $304_1$-$304_K$ (i.e., segment $204_{11}$ from frame $304_1$, segment $204_{11}$ from frame $304_2$, continuing until segment $204_{11}$ from frame $304_K$). The result is the formation of partition streams $402_{11}$-$402_{XN}$ corresponding to segments $204_{11}$-$204_{XN}$, respectively.

Partition streams $402_{11}$-$402_{XN}$, may be formed using framer 110 of FIG. 1.

Figure 5:
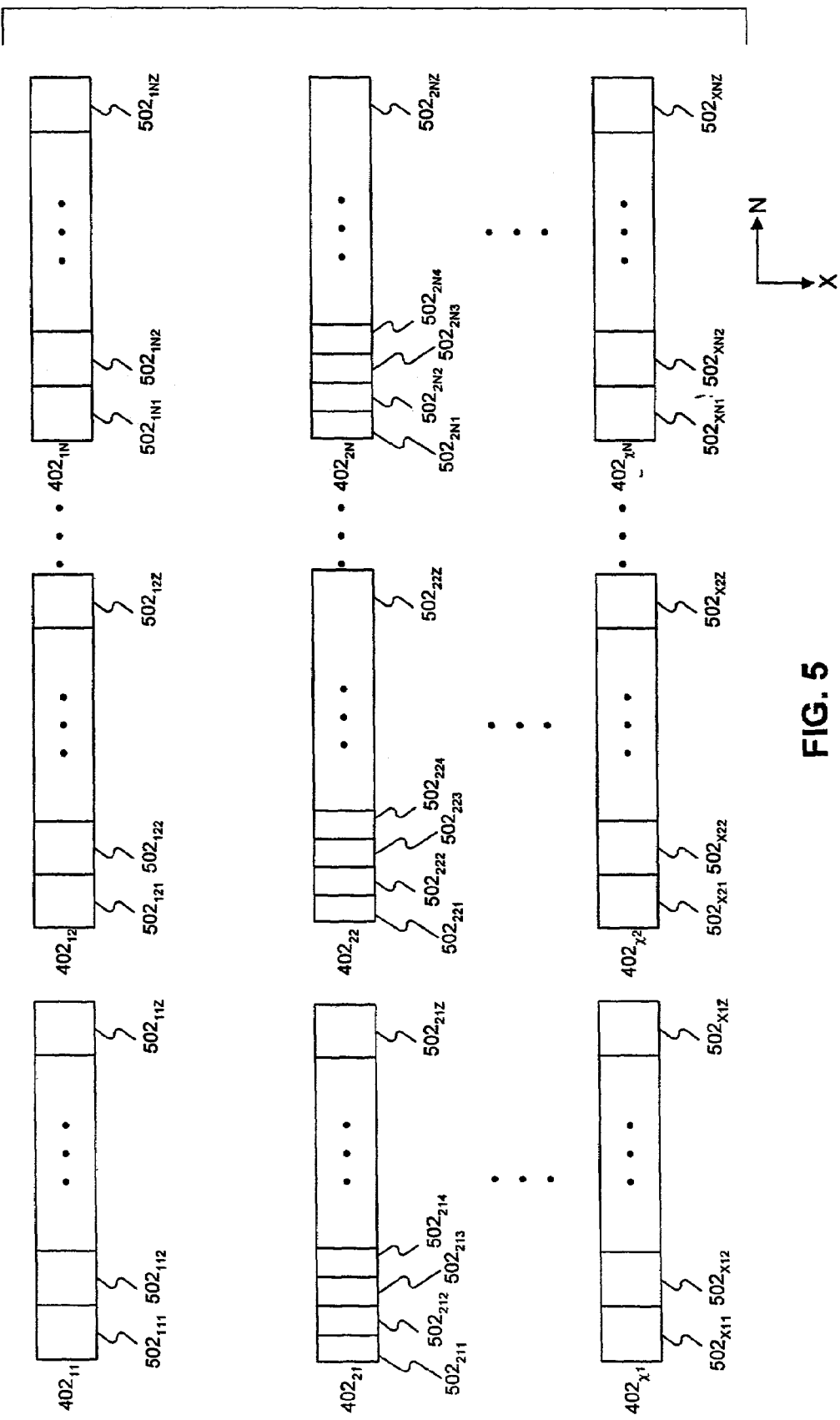
FIG. 5 is a schematic representation of partitioning of partition streams of FIG. 4 into blocks.

FIG. 5 further illustrates partition streams $402_{11}$-$402_{XN}$ of FIG. 4. Partition streams $402_{11}$-$402_{XN}$ include blocks $502_{111}$-$502_{XNZ}$, wherein X is the number of appliances $102_1$-$102_X$, N is the number of codes $118_1$-$118_N$ assigned by head end 106, and Z represents an index number to associate one of blocks $502_{111}$-$502_{XNZ}$ to one of X*N partition streams $402_{11}$-$402_{XN}$.

Figure 6:
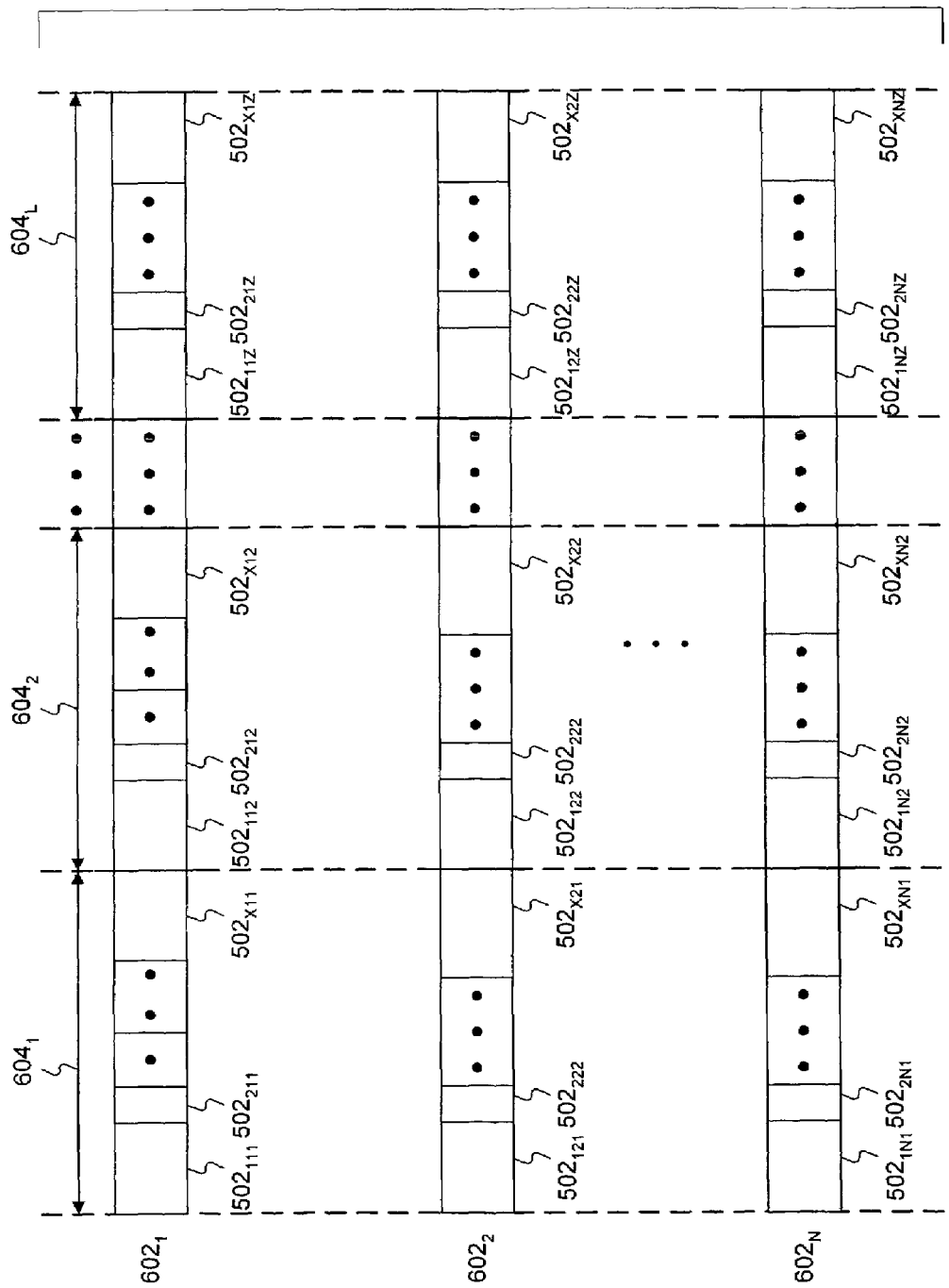
FIG. 6 is a schematic representation of code streams and the structure of S-CDMA frames constructed from the streams of FIG. 5.

Divisions representing segments $204_{11}$-$204_{XN}$ are removed and blocks $502_{111}$-$502_{XNZ}$ are created in partition streams $402_{11}$-$402_{XN}$. This is done to ensure that the divisions formerly representing segments $204_{11}$-$204_{XN}$ may be resized within partition streams $402_{11}$-$402_{XN}$ as blocks $502_{111}$-$502_{XNZ}$. The size of each of blocks $502_{111}$-$502_{XNZ}$ depends upon the bit rate and frame length of the corresponding source streams $302_1$-$302_X$. In other words, the bit rates and frame lengths of source streams $302_1$-$302_X$ generated by appliances $102_1$-$102_X$ will be preserved, through blocks $502_{111}$-$502_{XNZ}$ in the corresponding partition streams $402_{11}$-$402_{XN}$. The size of each of blocks $502_{111}$-$502_{XNZ}$ can be determined by Equation (1):

$$\text{Block size of } 502_{XNZ} = \text{bit rate of } 302_X / \text{S-CDMA frame rate} \quad (1);$$

where an S-CDMA frame is associated with one of a number N of code streams $602_1$-$602_N$ as illustrated in FIG. 6 and described more fully below. For example, in partition stream $402_{11}$, blocks $502_{11}$, continuing through $502_{11Z}$ are created, each having the same length. The length of each of blocks $502_{111}$-$502_{XNZ}$ correspond to a duration of transmitting time for each of frames $304_1$-$304_K$, eventually received by head end 106. The total number of blocks $502_{111}$-$502_{XNZ}$ for partition streams $402_{11}$-$402_{XN}$ is not definite and depends upon the respective size of each partition stream $402_{11}$-$402_{XN}$.

FIG. 6 illustrates the number N of code streams $602_1$-$602_N$, which are constructed from partition streams $402_{11}$-

$402_{XN}$ of FIG. 5. Code streams $602_1$-$602_N$ further contain blocks $502_{111}$-$502_{XNZ}$ and SCDMA frames $604_1$-$604_L$. X represents the number of appliances $102_1$-$102_X$, N is the number of codes $118_1$-$118_N$ assigned by head end 106, and L represents an index number to associate one of S-CDMA frames $604_1$-$604_L$ to code streams $602_1$-$602_N$.

Blocks $502_{111}$-$502_{XNZ}$ of FIG. 5 are reallocated so that each of code streams $602_1$-$602_N$ comprised from blocks $502_{111}$-$502_{XNZ}$ correspond to each of codes $118_1$-$118_N$. For example, when N=1, code stream $602_1$ contains blocks $502_{111}$-$502_{X1Z}$, because blocks $502_{111}$-$502_{X1Z}$ are associated with code $118_1$. In other words, for code stream $602_1$, all blocks corresponding with code $118_1$ are placed in code stream $602_1$. These would be blocks $502_{111}$, $502_{211}$, $502_{311}$, and continuing until $502_{X1Z}$. Thus, as frames $202_1$-$202_X$ associated with appliances $102_1$-$102_X$ transmit, according to FIGS. 2-6, all appliances $102_1$-$102_X$ transmit to head end 106, even when head end 106 determines that some of codes $118_1$-$118_N$ should not be processed. This results in every one of appliances $102_1$-$102_X$ sacrificing some bandwidth so that interruption of service is prevented and all of appliances $102_1$-$102_X$ may transmit.

Further, under the principles disclosed for S-CDMA in DOCSIS 2.0, an S-CDMA frame may be defined as one of S-CDMA frames $604_1$-$604_L$, which corresponds to the amount of time to process or service one of blocks $502_{111}$-$502_{XNZ}$ from every one of appliances $102_1$-$102_X$. In other words, as shown in FIG. 6, blocks $502_{111}$-$502_{XNZ}$ are formed so that in any given one of S-CDMA frames $604_1$-$604_L$, every one of appliances $102_1$-$102_X$ is serviced. This allows equal service to all appliances $102_1$-$102_X$ without disruption of service to any one of appliances $102_1$-$102_X$.

Code streams $602_1$-$602_N$ may be formed using framer 110 of FIG. 1.

Figure 7:
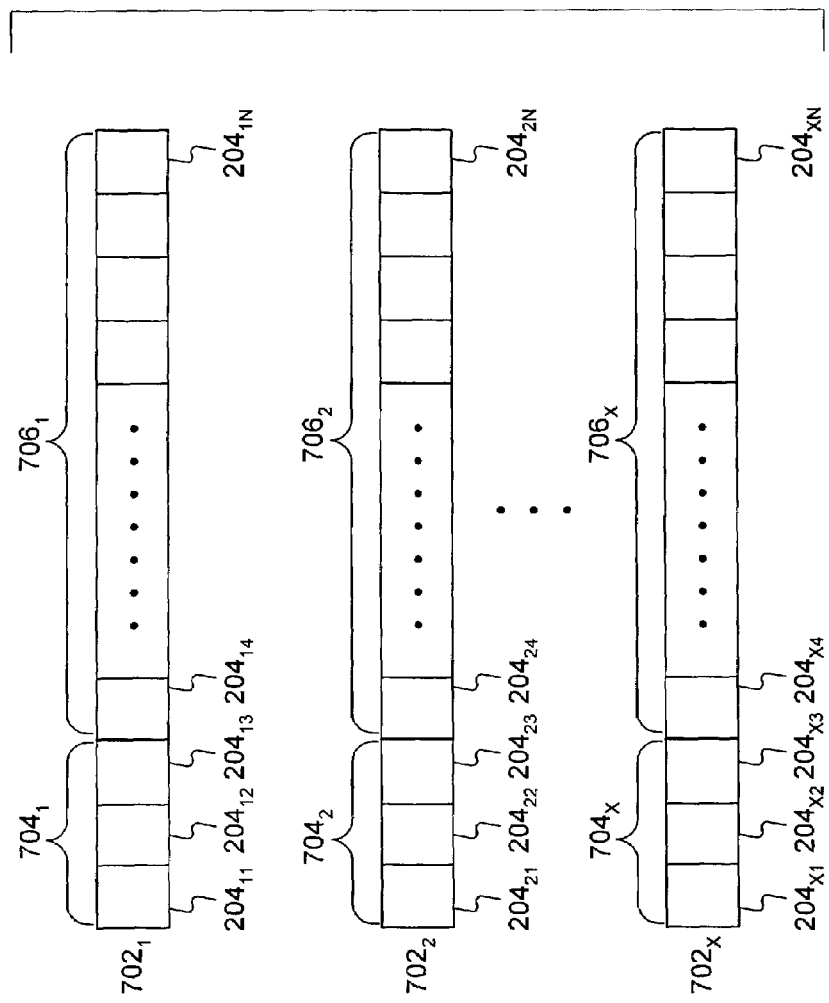
FIG. 7 is a schematic representation of an FGS signal constructed to be used in a system and method for partitioning streaming data coded with FGS over a cable network.

FIG. 7 illustrates a frame of an FGS encoded source stream constructed to be used in a system and method consistent with the present invention for partitioning data for use in a cable network. A number X of FGS data streams $702_1$-$702_X$ respectively contain base layers $704_1$-$704_X$ and enhancement layers $706_1$-$706_X$, wherein X represents the number of appliances $102_1$-$102_X$.

Implementing FGS data streams $702_1$-$702_X$ for the present system and method for partitioning data over a cable network requires that each of frames $202_1$-$202_X$ are required to form FGS data streams $702_1$-$702_X$. In order to do that, each of frames $202_1$-$202_X$ should be encoded to form base layers $704_1$-$704_X$ and enhancement layers $706_1$-$706_X$. Base layers $704_1$-$704_X$ must be transmitted, as this is a necessary characteristic of FGS encoding. However, enhancement layers $706_1$-$706_X$ may only be partially sent or not sent at all. FGS data streams $702_1$-$702_X$ may further contain segments $204_{11}$-$204_{XN}$, with corresponding codes $118_1$-$118_N$. Accordingly, code streams $602_1$-$602_N$ can be formed using the system and method previously discussed. FGS data streams $702_1$-$702_X$ are coded in such a manner that information of greater significance is placed ahead of that of less significance. Therefore, enhancement layers $706_1$-$706_X$ can be truncated to any length when the data rate of the source has to be adjusted due to variation of available bandwidth determined by head end 106. FGS data streams $702_1$-$702_X$ may be transmitted over an S-CDMA system as described, and incorporated herein by reference, by the DOCSIS 2.0 standard.

FGS data streams $702_1$-$702_X$ are generated by each corresponding appliance $102_1$-$102_X$ of FIG. 1. When FGS data streams $702_1$-$702_X$ are ready for transmission to head end 106, FGS data streams $702_1$-$702_X$ are framed according to the process outlined in FIGS. 2-6 and then spread across a radio frequency band, which may be implemented using spreader 112, and simultaneously transmitted to head end 106.

Figure 8:
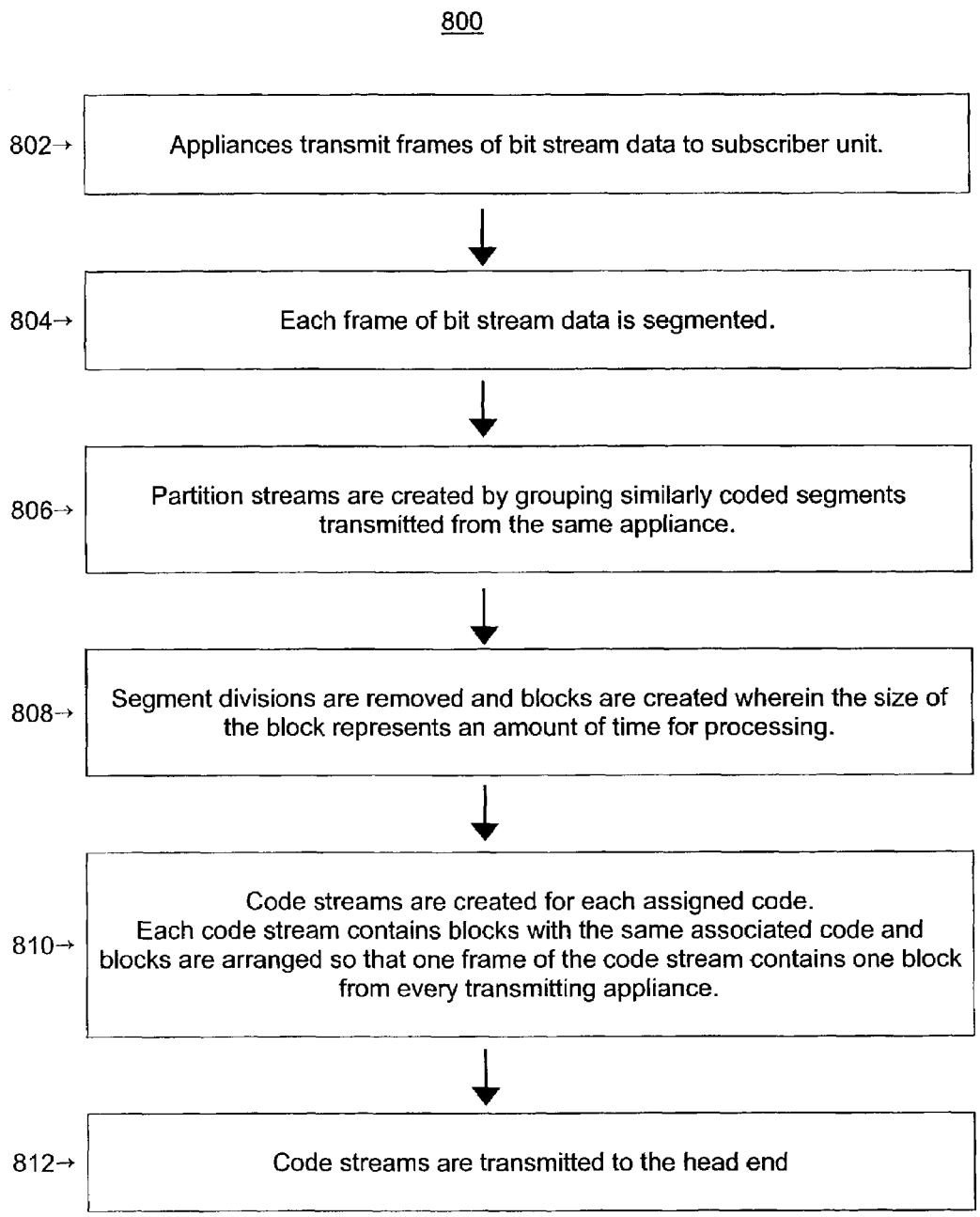
FIG. 8 is a flow chart illustrating a method for partitioning streaming data coded with FGS over a cable network.

FIG. 8 is a flow chart 800 illustrating a method for partitioning information over a cable network. At stage 802, appliances $102_1$-$102_X$ transmit FGS-coded streaming data to subscriber unit 104. The data can be in the form of bit stream frames, such as frames $202_1$-$202_X$. An example of the information that can flow from appliances $102_1$-$102_X$ to subscriber unit 104 is a video bit stream to head end 106 from a personal computer or an outgoing facsimile transmission.

At stage 804, frames $202_1$-$202_X$ of data are segmented. Codes $118_1$-$118_N$ may be assigned according to each of segments' $204_{11}$-$204_{XN}$ position in the original transmitted data stream. For example for source stream $302_1$, segment $204_{11}$ is assigned the highest level of importance, segment $204_{12}$ is assigned the second highest level of importance, and continuing to segment $204_{1N}$, which is assigned the lowest level of importance.

At stage 806, partition streams $402_{11}$-$402_{XN}$ are created by grouping segments $204_{11}$-$204_{XN}$ with the same associated one of codes $118_1$-$118_N$ and transmitting from the same one of appliances $102_1$-$102_X$. Also, in stage 808, divisions representing segments $204_{11}$-$204_{XN}$ are removed so that other divisions, such as blocks $502_{111}$-$502_{XNZ}$ can be inserted. The purpose of forming blocks $502_{111}$-$502_{XNZ}$ is to resize the divisions, where the size of each of blocks $502_{111}$-$502_{XNZ}$ is determined by the bit rate and frame length of the data transmitted from a particular one of appliances $102_1$-$102_X$. By removing segments $204_{11}$-$204_{XN}$ and creating blocks $502_{111}$-$502_{XNZ}$, the respective transmission rates of appliances $102_1$-$102_X$ are preserved.

At stage 810, partition streams $402_{11}$-$402_{XN}$ undergo a transformation to form code streams $602_1$-$602_N$. Code streams $602_1$-$602_N$ are created for codes $118_1$-$118_N$ containing blocks $502_{111}$-$502_{XNZ}$. Also, code streams $602_1$-$602_N$ may contain frames $604_1$-$604_L$. One of blocks $502_{111}$-$502_{XNZ}$ from each of appliances $102_1$-$102_X$ is contained within every one of frames $604_1$-$604_L$. For example, in frame 604, all of appliances $102_1$-$102_X$ will transmit every one of blocks $502_{111}$-$502_{XNZ}$ associated with code $118_1$. This ensures that when code streams $602_1$-$602_N$ are spread into SCDMA signals (stage 812) before being transmitted to head end 106, each of appliances $102_1$-$102_X$ is given an opportunity to transmit some portion of the total transmitted data in the event head end 106 determines that some of codes $118_1$-$118_N$ should not transmit. The cost to each of appliances $102_1$-$102_X$ is that the loss in bandwidth will be shared by all transmitting appliances $102_1$-$102_X$ and not cause the interruption of service to a select few of appliances $102_1$-$102_X$.

Other embodiments will be apparent to those skilled in the art from consideration of the specification and practice of the claims disclosed herein. It is intended that the specification and examples be considered as exemplary only, with a true scope and spirit of the invention being indicated by the following claims.

What is claimed is:

1. A method for partitioning information on a cable network, including one or more appliances and data associated with each transmitting appliance, wherein the associated data comprises a bit rate and a frame length, said method comprising:

creating a source stream from at least one data frame generated by each transmitting appliance, the source stream being a continuous and consecutive representation of the at least one data frame, wherein the source stream contains at least one source frame that corresponds to at least one data frame and the at least one source frame contains at least one segment, and wherein each segment is associated with one of the transmitting appliances and is assigned a code indicating a predetermined level of importance;

creating a partition stream by grouping each segment with one of the assigned codes from each source frame, each partition stream containing at least one block, wherein each block represents an amount of time in relation to the bit rate and frame length of the associated data; and creating a code stream, corresponding to each block with the same assigned code, and containing at least one coded frame, wherein each coded frame represents an amount of time to process one block from every source stream.

2. The method of claim 1, wherein the one or more appliances are coupled to a subscriber unit and creating a code stream further comprises the subscriber unit transmitting each code stream to a head end.

3. The method of claim 1, wherein the associated data has fine granularity scalability features comprising a base layer and an enhancement layer, the enhancement layer further comprising data that is ordered from a greater importance level to a lesser importance level.

4. The method of claim 1, wherein the predetermined level of importance is based upon a position occupied by each segment within each source stream.

5. The method of claim 1, wherein the cable network uses a synchronous code division multiple access system in compliance with DOCSIS 2.0.

6. A system for partitioning information on a cable network, wherein the cable network includes one or more appliances and data associated with each transmitting appliance, wherein the data comprises a bit rate and a frame length, said system comprising: means for creating source streams from at least one data frame generated by each transmitting appliance, the source streams being a continuous and consecutive representation of the at least one data frame, wherein the source streams contain at least one source frame that corresponds to at least one data frame and the at least one source frame contains at least one segment, and wherein each segment is associated with one of the transmitting appliances and is assigned a code indicating a predetermined level of importance;

means for creating partition streams by grouping each segment with one of the assigned codes from each source frame, each partition stream containing at least one block, wherein each block represents an amount of time in relation to the bit rate and frame length of the associated data; and means for creating code streams, corresponding to each block with the same assigned code, and containing at least one coded frame, wherein each coded frame represents an amount of time to process one block from every source stream.

7. The system of claim 6, wherein the one or more appliances are coupled to a subscriber unit and the subscriber unit transmits each code stream to a head end.

8. The system of claim 6, wherein the predetermined level of importance depends upon a position occupied by each segment within each source stream.

9. The system of claim 6, wherein the cable network uses a synchronous multiple access system in compliance with DOCSIS 2.0.

10. The system of claim 9, wherein the associated data has fine granularity scalability features comprising a base layer and an enhancement layer, the enhancement layer further comprising data that is ordered from a greater importance level to a lesser importance level.

* * * * *